United States Patent Office.

CHRISTIAN RUDOLPH, OF OFFENBACH, GERMANY, ASSIGNOR TO THE FIRM OF K. OEHLER, OF SAME PLACE.

BROWN DYE.

SPECIFICATION forming part of Letters Patent No. 462,414, dated November 3, 1891.

Application filed April 30, 1891. Serial No. 391,127. (Specimens.)

*To all whom it may concern:*

Be it known that I, CHRISTIAN RUDOLPH, a subject of the Emperor of Germany, resident at Offenbach-on-the-Main, Germany, have invented new and useful Improvements in Dye-Stuffs, of which the following is a specification.

If two molecules of diazotated paramidoacetanilid are reacting on one molecule metaphenylene-diamine in an alkaline solution, there is obtained a product which is difficultly soluble in diluted muriatic acid with a brown-red color, and which yields a brown dye-stuff easily soluble in water when further treated with concentrated muriatic acid. To prevent mistakes, I will mention that the brown dye-stuff of the German Patent No. 32,502 (which is produced with one molecule of the diazo combination $NH_2C_6H_4N=NCl$, derived from paraphenylene-diamine) is quite a different one from the dye-stuff produced as above.

My way of proceeding is as follows: I prepare the chloride of paradiazoacetanilid by mixing a solution of 18.6 parts of hydrochlorate of paramidoacetanilid in five hundred parts of water and ten parts of muriatic acid of $22\frac{1}{2}°$ Baumé, with seven parts of nitrite of soda in aqueous solution. The diazo-chloride thus obtained is poured into a solution of 10.6 parts of sulphate of metaphenylenediamine and eleven parts of sodium carbonate in five hundred parts of water. This mixture is stirred during twenty-four hours, filtered, and pressed. The press-cake is ground while still moist with one hundred parts of muriatic acid of 20° Baumé and then heated in the boiling-water bath. After one and one-half hours the solution obtained is diluted with three hundred parts of water and the dye-stuff precipitated by chloride of zinc and common salt, filtered, and dried.

The dye-stuff forms a bright black powder easily soluble in water. Caustic-soda lye added to the watery solution gives a brown precipitate. Zinc-dust and muriatic acid discolor its solution rapidly. The dye-stuff dissolves in concentrated sulphuric acid with a brown-red color.

The coloring-matter is especially suitable for dyeing jute and leather dark brown in one operation.

Having thus described my invention, what I claim, and desire to secure by Letters Patent, is—

As a new article of manufacture, the new brown basic dye-stuff herein described, derived from chloride of paradiazoacetanilid, metaphenylene-diamine, and concentrated muriatic acid, and consisting of a black powder which is easily soluble in water, of which the aqueous solution is rapidly discolored by zinc-dust and muriatic acid and gives a brown precipitate on the addition of caustic-soda lye, and which dissolves in concentrated sulphuric acid with a red-brown color.

In testimony whereof I have signed my name to this specification in the presence of two subscribing witnesses.

CHRISTIAN RUDOLPH.

Witnesses:
JEAN GRUND,
FRIEDRICH QUEHL.